March 17, 1970     E. C. CORNELL, JR     3,501,613
SUPPORT APPARATUS
Filed April 18, 1967     2 Sheets-Sheet 1
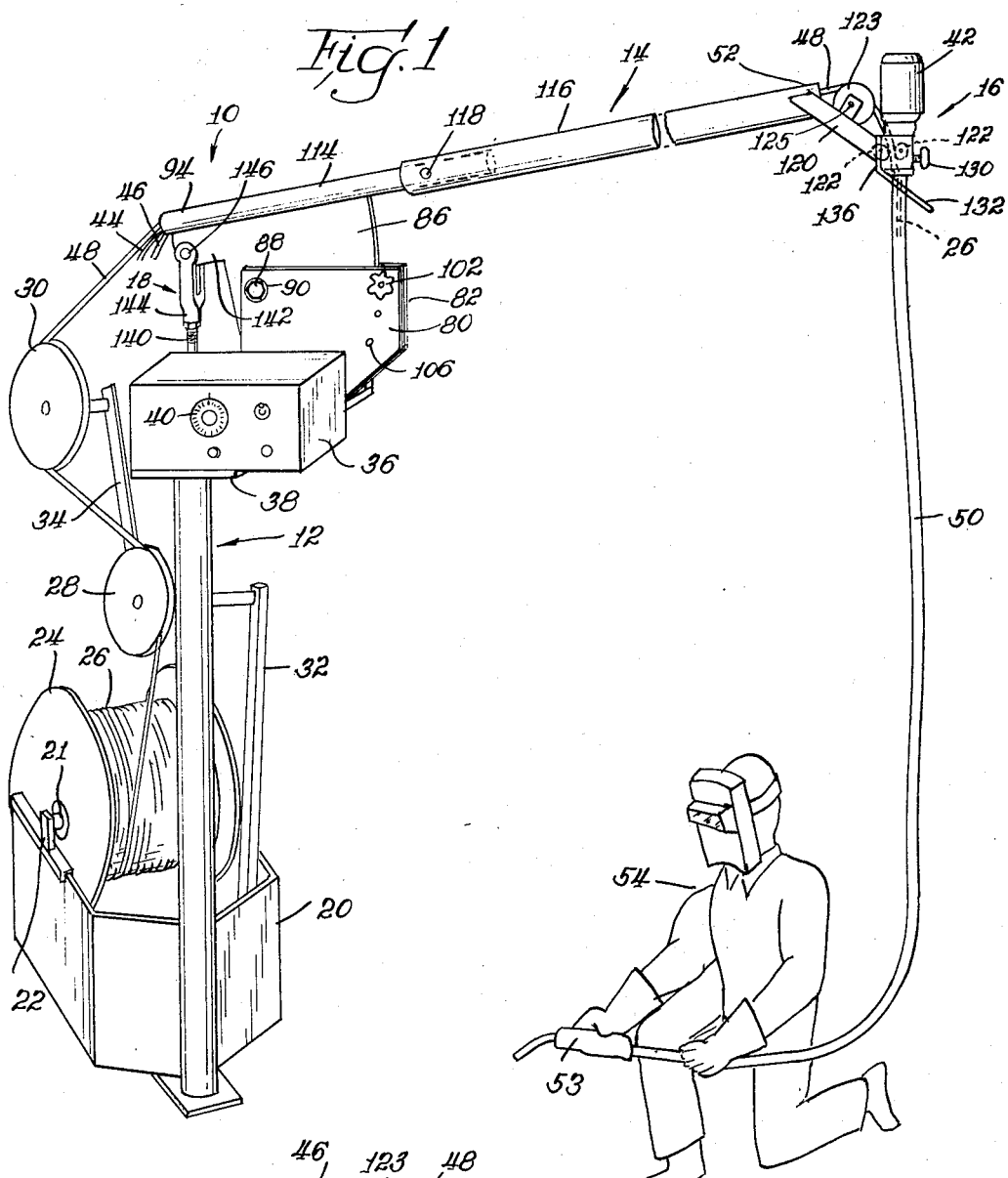
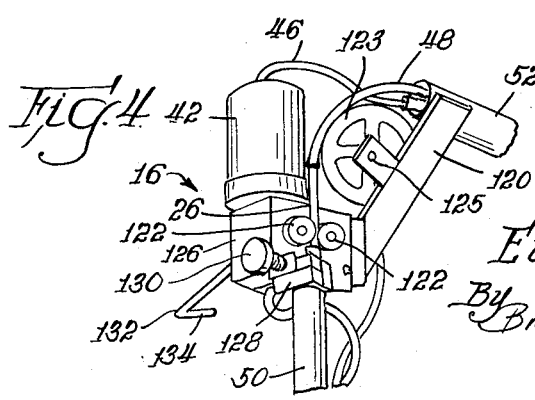
Inventor
Elliott C. Cornell, Jr.
By Brown, Jackson, Boettcher & Wienner
Atty's.

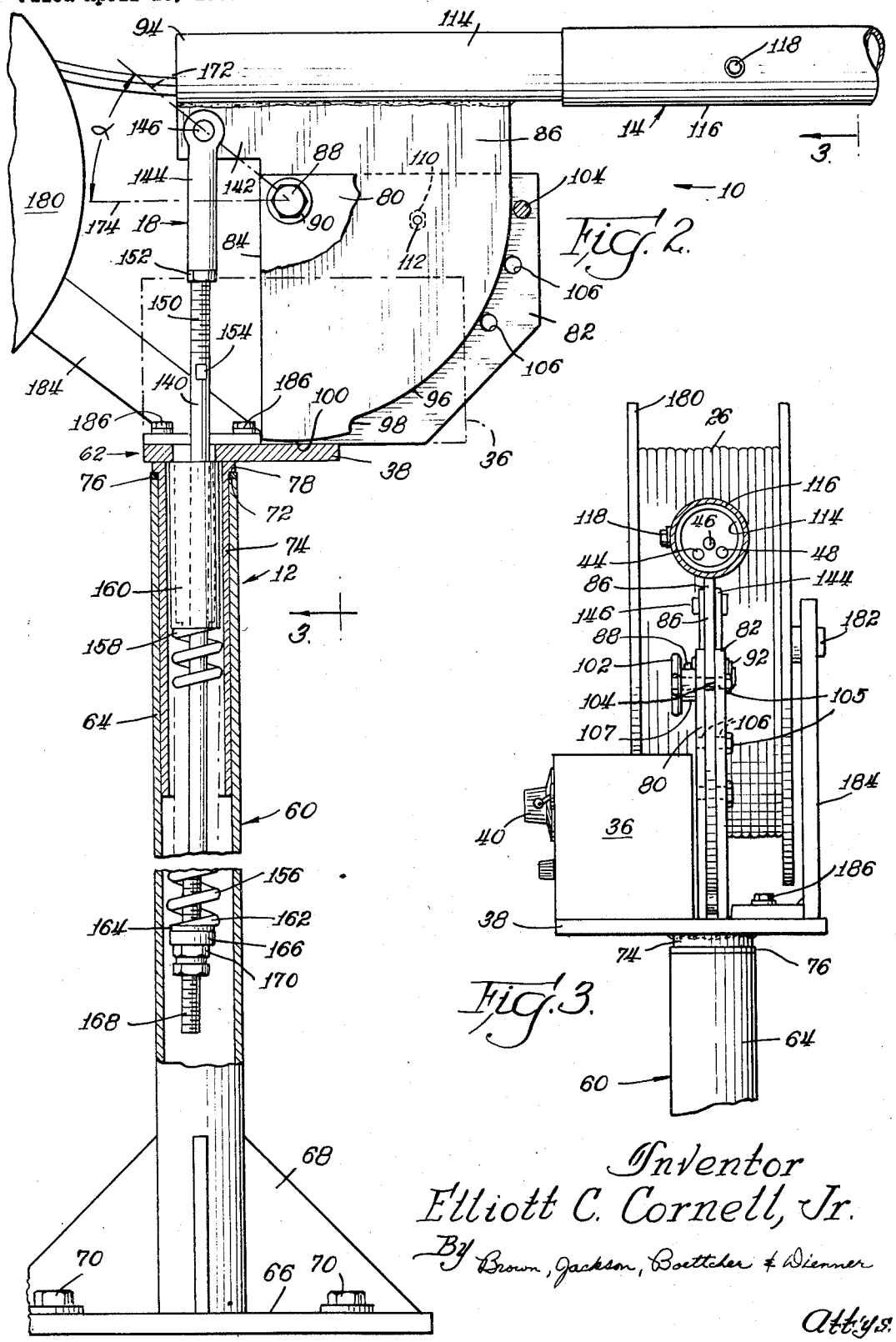

United States Patent Office 3,501,613
Patented Mar. 17, 1970

3,501,613
SUPPORT APPARATUS
Elliott C. Cornell, Jr., Brecksville, Ohio, assignor to The Auto Arc-Weld Mfg. Co., Cleveland, Ohio, a corporation of Ohio
Filed Apr. 18, 1967, Ser. No. 631,762
Int. Cl. B23k 9/00
U.S. Cl. 219—130
4 Claims

ABSTRACT OF THE DISCLOSURE

An apparatus for supporting welding cables and the like including a base support, an arm member pivotally supported on the base for supporting the cables, a counterbalance mechanism for establishing equal and opposite offsetting moments on the arm member, and wire feed means supported on the arm member for pulling wire along the arm.

BACKGROUND OF THE INVENTION

It is frequently necessary in manufacturing operations, and in particular semi-automatic welding operations, to provide lengthy extensions of flexible cable and the like which allow an operator working with a machine tool or weld gun attached to the end of a cable to reach hard-to-get-at work areas. Such lengthy extensions of flexible cable are generally supported on and pulled along the floor of the work area by the operator. Where many cables are required, they tend to become entangled and present a safety problem. Moreover, in many instances the loose cables become entwined with structures adjacent the workpieces and require the operator to untangle the cables, thus substantially reducing the operator's efficiency. It is therefore desirable that means be provided which support the cables in a manner so as not to impede the operator's movements and which eliminate the above noted safety hazards.

SUMMARY OF THE INVENTION

It is one of the primary objects of the present invention to provide a novel support apparatus for supporting cables and the like which allows an operator working with a tool attached to the outer ends of the cables to readily maneuver the tool without interference from dragging cables.

Another object of the present invention is to provide a novel support apparatus including a balanced freely swingable support arm member which supports cables and the like in a manner to increase the effective reach of the cables and allow ready positioning of the support arm and cables.

Another object of the present invention is to provide a support apparatus as described which includes wire feeding means disposed on an end of the support arm for pulling wire along the support arm and pushing the wire through a flexible conduit supported adjacent the wire feeding means.

A further object of the present invention is to provide a novel support apparatus as described including a counter-balancing spring mechanism for establishing equal and offsetting moments on the support arm to hollow the arm to be readily moved to a selected position to vary the reach of the flexible cables.

Another object of the present invention is to provide a support apparatus as described which finds particular application with welding equipment including weld wire supply reels and weld guns by being readily adapted for use with large floor supported weld wire supply reels or with smaller wire supply reels mounted on the support apparatus, and wherein the balanced support arm and wire feeding means provide increased reach for a weld gun and associated weld wire.

Another object of the present invention is to provide a novel support apparatus as described wherein the support arm comprises a tubular member which compactly encloses the cables therein, and which support apparatus greatly increases the efficiency of operators working with tools attached to the ends of cables supported by the apparatus.

In a prefered embodiment of a support apparatus constructed in accordance with the present invention, a base member includes an upper rotatable portion which pivotally supports a tubular support arm member at a position intermediate the ends of the support arm such that the arm is supported in off-center relation. The upper rotatable portion of the base member includes an adjustable hand wheel for limiting upward pivotal movement of the support arm and selectively clamping the arm against pivotal movement. An adjustable counterbalance spring mechanism is pivotally connected to the shorter section of the support arm member for establishing substantially equal and offsetting moments on the arm member about its pivotal support. A wire feeding device is supported on the end of the support arm furthest from the pivotal support axis of the arm to the base member for pulling a continuous length of wire from a wire supply reel through the support arm and pushing the wire through a flexible conduit supported on the arm adjacent the wire feeding device. Preferably, a guide wheel is rotatably supported on the arm member adjacent the wire feeding device for guiding the wire from the support arm to the feeding device. The wire supply reel may be suitably mounted adjacent the support base or on the rotatable upper portion thereof to allow full rotational movement of the support arm member.

Further objects and advantages of my invention, together with the organization and manner of operation thereof, may best be understood by reference to the following description of a preferred embodiment of the invention when taken in conjunction with the accompanying drawings, in which like reference numerals designate like parts throughout the several views.

BRIEF DESCRIPTION OF THE DRAWINGS

FIGURE 1 is a perspective view of a support apparatus constructed in accordance with the present invention illustrating the apparatus in conjunction with welding equipment including a floor supported weld wire supply reel and a weld gun;

FIGURE 2 is a fragmentary vertical side view, taken partly in section, with the control box and a portion of a support plate removed to illustrate the pivotal support for the support arm member and the counterbalance spring mechanism;

FIGURE 3 is a partial front view, partly in section, taken substantially along the line 3—3 of FIGURE 2; and FIGURE 4 is a perspective view of the wire feeding device and guide pulley mounted on an end of the support arm member.

DESCRIPTION OF A PREFERRED EMBODIMENT

Referring now to the drawings, and in particular to FIGURE 1, a support apparatus constructed in accordance with the present invention is illustrated in perspective in conjunction with welding equipment including a source or supply of weld wire, a flexible cable having a weld gun attached to one end thereof, and a control box.

The support apparatus, indicated generally at reference numeral 10, includes a generally upstanding base support means, indicated generally at 12, an elongated tubular support arm member, shown generally at 14, which is pivotally supported on the base support means 12 as described hereinbelow, weld wire feeding means, indicated generally at 16, supported on the support arm member 14, and counterbalance means, shown generally at 18, operatively associated with the support arm member 14 for establishing substantially equal and offsetting moments on the support arm about its pivotal connection to the support base means 12 as will be more fully described hereinbelow.

A weld wire supply reel support frame 20 is suitably fixedly secured to the supporting floor adjacent the upstanding base support 12 and includes upstanding support brackets 22 which serve to rotatably support a source of continuous weld wire comprising a conventional reel 24 having a continuous length of weld wire 26 thereon. The reel 24 is freely rotatable on a support shaft 21 suitably supported between the brackets 22 to allow the weld wire 26 to be readily drawn from the reel in a manner to be described hereinbelow. A pair of pulley members 28 and 30 are suitably rotatably mounted on support struts 32 and 34, respectively, such that the pulleys 28 and 30 are supported in generally planar relation and serve to guide the weld wire 26 between the reel 24 and the support arm member 14 so that the weld wire may be readily introduced into and pulled along the tubular support arm member as described below.

A control box 36 is suitably secured on a support plate 38 of the upstanding base support 12 and encases conventional control circuitry which may be coupled to a suitable 115-volt AC supply (not shown). The control box 36 includes a weld wire feed adjustment dial 40 for controlling an electric motor 42 of the weld wire feeding means 16 in a conventional manner and includes means (not shown) to provide a constant weld current to the weld wire 26. The control box 36 and its associated control circuitry may be of commercially available construction and, per se, form no part of the present invention. The electrical conductors necessary to effect welding, such as a weld wire electrode cable (not shown) and an electrical conductor for the drive motor 42 (not shown), are supported within the tubular support arm member 14 through suitable flexible shield conduits 44, 46, respectively, with the weld wire electrode and the electric motor conductor being suitably connected through the control box 36 to the AC power supply. The weld wire 26 is suitably supported within the tubular support arm member 14 by a flexible cable shield 48 from which it is pulled by the weld wire feeding means 16 as described below. It will be understood that where it is desirable to provide a gas shield about the weld wire electrode at the point of weld, a suitable gas hose may be supported within the support arm member 14 in similar fashion to the flexible cable shields 44, 46. The support arm member 14 includes means to support a flexible tubular cable or conduit 50 adjacent an end portion 52 thereof in a manner such that the cable receives the weld wire 26 and the above noted weld wire electrode and its shield 44 therethrough. An upper end of the flexible cable 50 is supported adjacent the wire feeding means 16 while the end of the cable opposite the weld wire feeding means is adapted to have a weld gun 53 attached thereto, which gun is of a conventional construction and adapted to be readily handled by an operator 54 to effect weldments in a conventional manner.

Referring now to FIGURE 2, taken in conjunction with FIGURES 1 and 3, the upstanding base support means 12 includes a lower support member 60 and an upper support member indicated generally at 62. The lower support member 60 comprises a generally cylindrical tubular support member 64 having a base plate 66 suitably secured to the bottom end thereof with support plates 68 being secured to the base plate 66 and the peripheral surface of the tubular support member 64 to maintain the support member in generally normal relation to the base plate 66. The base plate 66 may be suitably secured to the floor surface through bolts 70 to maintain the lower base support member 60 in upstanding relation to the floor. An upper end surface 72 on support member 60 defines a circular opening in the tubular support which receives a downwardly depending cylindrical tubular portion 74 of the upper support member 62. The depending tubular portion 74 of the upper support member 62 has an outer diameter slightly less than the inner diameter of the tubular support member 64 so as to be freely rotatable and axially slidable therein, and is suitably secured in normal relation to the support plate 38 which forms a part of the upper support member 62. An annular bearing member 76, made of a suitable bearing material such as bearing bronze, is disposed on the tubular portion 74 in abutting relation to a shoulder 78 thereon to engage the upper end surface 72 of the lower support member 60 and provide a bearing surface between the lower and upper support members 60 and 62, respectively, for rotatably mounting the upper support member on the lower support member.

The upper base member 62 includes a pair of vertically upstanding support plates 80 and 82 which are suitably secured in generally normal relation to the support plate 38 as by welding. The support plates 80 and 82 are supported on the support plate 38 such that vertical edge portions 84 thereon are radially spaced from the axis of rotation of the upper base support member 62 on the lower base support member 30. The vertically extending support plates 80 and 82 of the upper support member 62 are supported in parallel spaced relation and receive a plate member 86 therebetween, which plate member is secured to the peripheral surface of the tubular support arm member 14 in radial relation therewith in any suitable manner such as by welding. The plate member 86 serves to support the arm member 14 for vertical pivotal movement on the upper base member 62 of the base support 12 through a horizontal support pin 88 which is received through and axially secured in appropriate aligned apertures provided in the support plates 80 and 82 and the plate 86. The support pin 88 may be secured in fixed axial relation between the support plates 80 and 82 in any suitable fashion such as by a hexagonal shaped head portion 90 on one end thereof and a suitable stop nut 92 on the opposite end thereof.

The plate member 86 is fixedly secured to the tubular support arm member 14 intermediate a first end portion 94 thereon and the above noted end portion 52, termed the second end portion, such that the support arm member is supported in off-center relation on the support base 12 with the second end portion 52 being spaced a further distance from the pivotal axis 88 than the first end portion 94. Plate 86 has a generally radial arcuate edge portion 96 having its radial center coincident with the pivotal axis defined by support pin 88 with a shoulder portion 98 being provided intermediate the radial edge 96 and a second radial edge portion 100. The radial edge portion 100 has a radius less than the distance between the support plate 38 and the axis of rotation defined by the support pin 88 to allow ready clearance of the plate member 86 during vertical pivotal movement of the support arm member 14 about the support pin 88.

The base support means 12 includes means to limit upward pivotal movement of the support arm member 14 comprising a hand wheel 102 (FIGURE 3) having a threaded stem portion 104 which is selectively received within one of three sets of horizontally aligned apertures 106 provided in the support plates 80 and 82. A threaded nut 105 is suitably secured to the outer surface of plate 82 in axial alignment with each of the pairs of apertures 106 to threadedly receive the stem portion 104 of the hand wheel 102 when selectively disposed in one of the pairs of apertures 106. The centers of the apertures 106 lie on a radial arc having its center coincident with the pivotal axis defined by the support pin 88 with the radius being greater than the radius of the radial edge portion 96 of plate member 86 such that the edge 96 will not engage the stem portion 104 of the hand wheel 102 when the support arm 14 is pivoted about support pin 88. The radial positions of the apertures 106 are such that the shoulder portion 98 on the plate member 86 will engage the stem portion 104 of the hand wheel 102 when the hand wheel is supported in one of the pairs of apertures 106 thus limiting upward pivotal movement of the support arm. Referring to FIGURE 2, it can be seen that by changing the hand wheel 102 from one pair of apertures 106 to another pair, the allowable upward pivotal movement of the support arm member 14 will be correspondingly increased or reduced.

The thickness of the plate member 86 is slightly less than the distance between the spaced support plates 80 and 82 to allow free pivotal movement of the support arm member 14 about the support pin 88 when the hand wheel 102 is in a relatively loosened position. The hand wheel 102 includes a shoulder portion 107 which abuts the outer surface of the end plate 80 when the hand wheel is threaded into a receiving nut 105. By tightening the shoulder portion 107 of the hand wheel 102 against the support plate 80 through threaded engagement of the stem portion 104 with one of the threaded nuts 105, the support plates 80 and 82 will be drawn toward each other and thus against the adjacent side surfaces of the plate member 86. Such tightening will increase the frictional resistance to pivotal movement of the support arm member 14 about the pivot pin 88 with continued tightening of the hand wheel 102 serving to provide means to lock the support arm against pivotal movement relative to the base support 12.

Preferably, the upper base member 62 of the upstanding base support 12 includes a second means adapted to lock the support arm member 14 against pivotal movement about the support pin 88. Such second means comprises a removable lock bolt 110 (FIGURE 2) which may be inserted into a threaded aperture provided in the support plate 82 and an associated aperture 112 in the plate member 86 such that the lock bolt is received by aperture 112 when the support arm 14 is in a generally horizontal direction. It is desirable to insert lock bolt 110 and thus lock the support arm member 14 relative to the upper support member 62 during adjustment of the counterbalance means 18 when the upper support member 62 and support arm 14 are removed from their supported position within the tubular support 64 as will be more fully described hereinbelow.

The tubular elongated support arm member 14 may comprise two tubular sections 114 and 116 with the tubular portion 114 including the first end portion 94 and having the plate member 86 secured thereto, while the tubular portion 116 includes the second end portion 52 of the support arm. The tubular portion 116 is slightly larger than the tubular portion 114 to receive the portion 114 therein in coaxial relation therewith. The assembled tubular portions 114 and 116 may be suitably coupled through a locking screw 118 received within corresponding threaded apertures in the tubular portions 114 and 116. By providing the support arm member 14 in two tubular portions as described, the outer tubular portion 116 may be readily removed from the portion 114 and replaced with a tubular portion of greater length, thus allowing ready interchangeability in lengths of the support arm. If desirable, a plurality of apertures may be provided along the longitudinal length of the tubular portion 114 to allow the locking screw 118 to engage any selected one of the apertures thus providing a means to vary the distance between the end portions 52 and 94 of the support arm without changing the outer portion 116 as above described.

As noted above, the support arm member 14 includes means to support the flexible hollow cable 50 adjacent the second end portion 52 thereof. Referring to FIGURES 1 and 4, such means includes a pair of support brackets 120 which may be suitably secured to the peripheral surface of the support arm 14 adjacent the end portion 52 in any suitable manner such as by welding. The support brackets 120 are generally angularly disposed relative to the longitudinal axis of the support arm 14 such that they extend beyond the end 52 of the support arm with the outer ends of the support brackets suitably supporting the weld wire feeding means 16. The weld wire feeding means 16 is of a conventional construction and includes a pair of rotatably driven roller members 122 supported in spaced planar relation. The peripheral surfaces of the driven roller members 122 are knurled and spaced apart a distance substantially equal to the diameter of the weld wire 26 which, as noted above, is supported from travel within the tubular support arm 14 within a flexible cable shield 48. The weld wire 26 is positioned between the knurled rollers 122 during operation such that the knurled rollers may pull the weld wire through the shield 48 from the weld wire supply reel 24. The electric drive motor 42 is suitably supported on a housing member 126 of the weld wire feeding means 16 to effect rotational movement of the knurled rollers 122 in a conventional manner. A support bracket 128 is secured to the housing 126 of the weld wire feeding means 16 and serves to support the adjacent end of the flexible cable 50 such that the weld wire 26 will be fed from the knurled rollers 122 into the cable conduit 50 whereupon it is pushed through the conduit to the weld gun 53. The wire feeding means 16 includes an adjustment knob 130 supported on the housing 126 for varying the distance between the knurled rollers 122 to compensate for various diameter weld wires which may be used with the subject support device. The support brackets 120 and 128, in combination with the housing 126 of the weld wire feeding means 16, comprise the means to support the flexible tubular cable 50 on the support arm member 14.

A guide wheel 123 is rotatably supported adjacent the second end portion 52 of the support arm 14 on a support pin 125 which in turn suitably secured to and supported by the support brackets 120. The guide wheel 123 is positioned to guide the weld wire 26 and its protective sheath 48 in a uniform path from the tubular support arm 14 to the cable 50 through drive rollers 120 and thus reduce drag on the weld wire.

Preferably, a generally L-shaped guard member 132 having a leg portion 134 is positioned generally in front of the weld wire feeding means 16 to prevent accidental movement of the adjustment knob 130. The guard member 132 may be suitably secured to the housing 126 of the feeding means 16 through an adjustable support bracket 136.

Referring now to FIGURE 2 in conjunction with FIGURE 1, the counterbalance means 18 is pivotally connected to the support arm member 14 at a position intermediate the first end portion 94 and the pivotal support axis of the support arm 14 about the upper base member 62 as defined by the support pin 88. The counterbalance means 18 includes a support shaft 140 which is pivotally connected to a portion 142 of the plate member 86, and thus to the support arm member 14, through a generally U-shaped clevis member 144 and a support pin 146. The support shaft 140 of the counterbalance means 18 extends downwardly through an aperture 148 in the support plate 38 of the upper base support member 62 and into the tubular member 74 of the upper base member and the tubular support 64 of the lower base member 60. The support shaft 140 has a threaded upper end portion 150 which is received within an appropriate threaded aperture within the clevis memebr 144. A lock nut 152 is disposed upon the upper threaded portion 150 of the shaft 140 to abut the lower end of the celvis 144 in locking relation and thereby lock the shaft 140 in fixed axial relation therein in a conventional manner. Preferably, a pair of wrench flats 154 are provided below the threaded portion 150 of the shaft 140 to assist in adjustment of the shaft within the clevis 144.

The counterbalance means 18 further includes a helical spring 156 which is operatively associated with the support shaft 140 and the upper base member 62 of the base support means 12 such that the spring 156 is maintained in continual compression with the resultant spring compression force serving to establish substantially equal and opposite moments on the support arm member 14 about its pivotal axis defined by the support pin 88. More particularly, the helical spring 156 is disposed about the support shaft 140 within tubular members 64 and 74 and includes an upper end portion 158 which abuts an annular spacer sleeve or stop member 160 disposed on the support shaft 140 between the upper end 158 of the helical spring and the support plate 38 of the upper base member 62. The annular spacer sleeve 160 serves as an upper stop against which the helical spring 156 may be compressed. The helical spring 156 further includes a lower end portion 162 which abuts an annular washer 164 which in turn seats against a thrust bearing 166, both the washer 164 and annular thrust bearing 166 being supported on a lower threaded end portion 168 of the support shaft 140 and being axially adjustable thereon through a lock nut-lock washer arrangement 170.

With the helical spring 156 being supported on the support shaft 140 between the sleeve spacer 160 and the thrust washer 166 as above described, it can be seen that the compression of helical spring 156 may be readily adjusted by either of two methods when the support apparatus 10 is in assembled relation. The first method is through threading the upper threaded end portion 150 of the support rod 140 into the clevis 144, while the second method is to move the thrust washer 166 upwardly through adjustment of the lock nut-lock washer arrangement 170. It will be understood that in the latter method, the assembly comprising the support arm member 14, the counterbalance means 18 and the upper base member 62 must be removed from the lower base member 60 to allow access to the lock nut-lock washer arrangement 170.

Referring to FIGURE 1, it can be seen that with the support arm member 14 pivotally supported on the support base 12 through the support pin 88 such that the pivotal axis of the support arm member 14 about the base support is off-center relative to the length of the support arm, the weight of the extended length of the support arm between the pivotal connection 88 and the end 52 thereof, the weld wire feeding means 16, the flexible cable 50, and the associated supporting brackets will effect a greater moment on the support arm 14 about its pivotal axis 88 than that created by the length of the support arm between the pivotal axis 88 and the end portion 94. By proper selection of the helical spring 156 of the counterbalance means 18, and proper compression adjustment of the helical spring between the sleeve spacer 160 and the thrust bearing 166, the counterbalance means will establish a moment on the support arm 14 about its pivotal axis 88 substantially equal to and in a direction to off-set the moment due to the extended support arm, the weld wire feeding means 16 and the cable 50 as above described.

It has been found that substantially equal and offsetting moments on the support arm 14 about its pivotal axis 88 through the counterbalance means 18 may best be obtained when a line, indicated at 172, connecting the pivotal axis defined by the pivot pin 146 connection of the counterbalance means 18 to the support arm 14 and the pivotal axis defined by the support pin 88 supporting the arm member 14 on the upper base member 62 of the base support means 12, forms an included angle alpha of about 20–30 degrees with a horizontal line 174 when considering the angle in a vertical plane and with the longitudinal axis of the arm member 14 being disposed in horizontal posiiton (FIGURE 2). The noted 20–30 degree angularity relationship above noted has been found to provide the desirable counterbalance through the normal range of raising and lowering of the support arm member 14 about its pivotal axis 88.

Referring to FIGURES 2 and 3, if desirable a weld wire supply reel 180, having a smaller capacity than the reel 24 above described, may be suitably rotatably supported on the upper base member 62 of the upstanding base support means 12. The weld wire supply reel 180 may be suitably rotatably supported on a horizontally disposed support shaft 182 which is secured to and supported by a support bracket 184 which in turn is secured to the support plate 38 through a pair of bolts 186. The smaller weld wire supply reel 180 is preferred when the welding operation is in a location where substantially full horizontal rotation of the support arm about the upstanding base support 12 is desired, such being allowable by virtue of the elimination of the floor supported supply reel and guide pulleys 28 and 30 above described with reference to FIGURE 1.

Having thus described the elements comprising a preferred embodiment of a support apparatus in accordance with the present invention, its operation will now be briefly described. As above noted, the weld wire 26 may be supplied from the large floor supported supply reel 24 or a smaller supply reel 180 supported on the upper base member 62 of the upstanding base support means 12. The selection of the weld wire supply reel may be based upon the amount of horizontal rotation desired for the support arm 14 about the lower support base 60. The weld wire is inserted through its flexible cable shield 48 through tubular support arm 14 and over the guide pulley 123 between the knurled rollers 122 of the weld wire feeding means 16 and through the flexible cable 50 to the weld gun 53. The required electrode conductors and contactor cables are correspondingly positioned within the support arm 14 and through the flexible cable 50. Based upon the known weights of the extended portion of the support arm 14, the weld wire feeding means 16, and the flexible cable 50, the helical spring 156 is selected and placed in preset compression between the sleeve spacer 160 and the thrust bearing 166 such that it establishes substantially equal and offsetting moments about the pivotal axis 88 of the support arm 14 when the support is in a horizontal position as above decribed.

The operator may then select the desired feed for the weld wire 26 through the feed adjustment dial 40 on the control box 36 and energize the conductors necessary to effect welding through the weld gun 53. When it is desired to vary the reach of the flexible cable 50, the operator may horizontally rotate the support arm 14 about the support base 12 and further, may vertically pivot the support arm upwardly or downwardly about its support axis 88. The support arm 14 when so pivotally positioned, will maintain its selected position by virtue of the counterbalance means 18. Should the operator desire to limit the upward pivotal movement allowed for the support arm 14, he may vary the position of the hand wheel 102 to thus change the position at which the shoulder portion 98 on the plate member 86 abuts the stem 104 of the hand wheel 102. By further tightening of the hand wheel 102, the operator may substantially increase the force necessary to pivot the support arm 14 about its pivotal axis 88 while continued tightening of the knurled knob 102 will effect a locking of the plate 86 between the support plates 80, 82 to lock the support arm in its selected pivotal position.

The supoprt apparatus in accordance with the present invention thus allows an operator working with a weld gun or other tool attached to the outer end of the flexible cable 50 to readily maneuver the weld gun without interference from dragging cables. Moreover, the balanced freely swingable support arm member 14 may be readily positioned as desired to increase the effective reach of the welding gun.

While the above support apparatus has been illustrated in conjunction with welding equipment, it will be understood that the subject invention finds ready application in other environments where it is desirable to supoprt cables and the like in a raised position with the support means being readily movable to change the reach of the cables so supported.

Thus, while a preferred embodiment of my invention has been shown and described, it will be understood that changes and modifications may be made therein without departing from the invention in its broader aspects and, therefore, the appended claims are intended to cover all such changes and modifications as fall within the true spirit and scope of my invention.

I claim:

1. A welding apparatus for use with a source of continuous length wire, comprising, in combination, upstanding base support means, an elongated support arm member having first and second end portions, said arm member being pivotally supported by said base support means generally adjacent said first end portion such that said arm member is supported in off-center relation, said arm member being adapted to support the weld wire in guiding relation along the length thereof, weld wire feeding means supported by said support arm adjacent said second end portion, a flexible generally tubular cable supported by said support arm adjacent said wire feeding means for association therewith, counterbalance means including a support shaft and a helical compression spring operatively associated with said arm member and said base support means to continuously establish equal and offsetting moments on said support arm to balance the same during upward and downward pivotal movement thereof, said support shaft being pivotally connected to said support arm opposite the portion of said support arm extending between the pivotal connection of said arm to said base support means and said wire feeding means, said helical compression spring being directly interposed between said support shaft and said base support means and being maintained in continual compression with the resultant spring compression force serving to continuously establish said equal and offsetting moments, and weld gun means associated with said flexible cable opposite said wire feeding means, said feeding means being adapted to pull weld wire along the length of said support arm and to push the weld wire through said flexible cable to said weld gun means.

2. A welding apparatus as defined in claim 1 wherein said support shaft is adjustable adjacent its pivotal connection to said support arm to vary the compression of said helical spring without disassembling the welding apparatus.

3. A welding apparatus as defined in claim 1 wherein said base support means includes a genrally upright tubular portion adapted to receive said support shaft downwardly therein, said support arm being pivotally supported on said base support means for vertical pivotal movement, and wherein a line connecting the pivotal axis defined by the pivotal connection of said support shaft to said arm member and the pivotal axis defined by the pivotal support of said arm member on said base support means forms an included angle of about 20–30 degrees with the horizontal when considered in a vertical plane with the arm member disposed in a horizontal position.

4. A welding apparatus as defined in claim 1 wherein said weld wire feeding means comprises a single drive motor and driven roller means supported adjacent said second end portion of said support arm, said driven roller means being adapted to pull said weld wire along the length of said support arm and push the weld wire through said flexible cable to said weld gun means.

References Cited

UNITED STATES PATENTS

| | | | |
|---|---|---|---|
| 1,319,792 | 10/1919 | Phorson | 248—123 |
| 1,550,651 | 8/1925 | Charter | 219—124 |
| 1,569,564 | 1/1926 | Muller | 314—68 X |
| 2,156,862 | 5/1939 | Maugard | 248—123 |
| 2,171,028 | 8/1939 | Gelb | 248—123 |
| 2,387,568 | 10/1945 | Drott et al. | 214—65 |
| 2,416,910 | 3/1947 | Crosby et al. | 248—280 |
| 2,858,946 | 11/1958 | Breed | 212—64 |
| 2,940,621 | 6/1960 | White | 214—75 |
| 2,445,863 | 7/1948 | Sarazin | 219—130 |
| 2,748,236 | 5/1956 | Landis et al. | 219—130 |

JOSEPH V. TRUHE, Primary Examiner

J. G. SMITH, Assistant Examiner

UNITED STATES PATENT OFFICE
CERTIFICATE OF CORRECTION

Patent No. 3,501,613                            March 17, 1970

Elliott C. Cornell, Jr.

It is certified that error appears in the above identified patent and that said Letters Patent are hereby corrected as shown below:

In the heading to the printed specification, lines 3 to 5, "assignor to The Auto Arc-Weld Mfg. Co., Cleveland, Ohio, a corporation of Ohio" should read -- assignor, by mesne assignments, to National-Standard Company, Niles, Mich., a corporation of Delaware --.

Signed and sealed this 5th day of January 1971.

(SEAL)
Attest:

Edward M. Fletcher, Jr.                      WILLIAM E. SCHUYLER, JR.
Attesting Officer                              Commissioner of Patents